United States Patent
Lee et al.

(10) Patent No.: US 8,401,566 B2
(45) Date of Patent: Mar. 19, 2013

(54) MOBILE TERMINAL AND METHOD FOR CONVERTING BROADCAST CHANNEL OF A MOBILE TERMINAL

(75) Inventors: Ji-Yeon Lee, Seoul (KR); Won-Jong Lee, Gyeonggi-do (KR); Won-Jae Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 743 days.

(21) Appl. No.: 12/125,837

(22) Filed: May 22, 2008

(65) Prior Publication Data

US 2009/0117943 A1    May 7, 2009

(30) Foreign Application Priority Data

Nov. 6, 2007    (KR) .................. 10-2007-0112865

(51) Int. Cl.
 *H04H 20/74*    (2008.01)
(52) U.S. Cl. ............... 455/456.1; 455/456.2; 455/552.1; 725/38; 725/39; 725/62
(58) Field of Classification Search ............... 455/456.1, 455/456.2, 552.1; 375/240.27; 725/38, 39, 725/56, 62; 345/2.2, 201, 501.1
See application file for complete search history.

(56) References Cited

U.S. PATENT DOCUMENTS

| | | | |
|---|---|---|---|
| 7,711,315 B2 * | 5/2010 | Aaltonen et al. ............. 455/3.02 |
| 2005/0278737 A1 * | 12/2005 | Ma et al. .......................... 725/40 |
| 2006/0265637 A1 * | 11/2006 | Marriott et al. ............ 715/500.1 |
| 2007/0238447 A1 * | 10/2007 | Balestrieri ................. 455/414.1 |

FOREIGN PATENT DOCUMENTS

| | | |
|---|---|---|
| CN | 101064523 | 10/2007 |
| KR | 100722187 | 5/2007 |

* cited by examiner

*Primary Examiner* — Patrick Edouard
*Assistant Examiner* — Julio Perez
(74) *Attorney, Agent, or Firm* — Lee, Hong, Degerman, Kang & Waimey

(57) ABSTRACT

A mobile terminal and method for converting a channel on a desired channel list is provided such that a channel list can be changed while receiving broadcast data without having to select a menu when a channel change is desired. An input method corresponding to a key or a touch input received while receiving a broadcast is detected and either a currently set channel list is changed to a different list or the currently set channel list is changed to a different channel list and a channel is simultaneously changed on the different channel list according to the detected input method.

17 Claims, 11 Drawing Sheets

FIG. 10
(a)
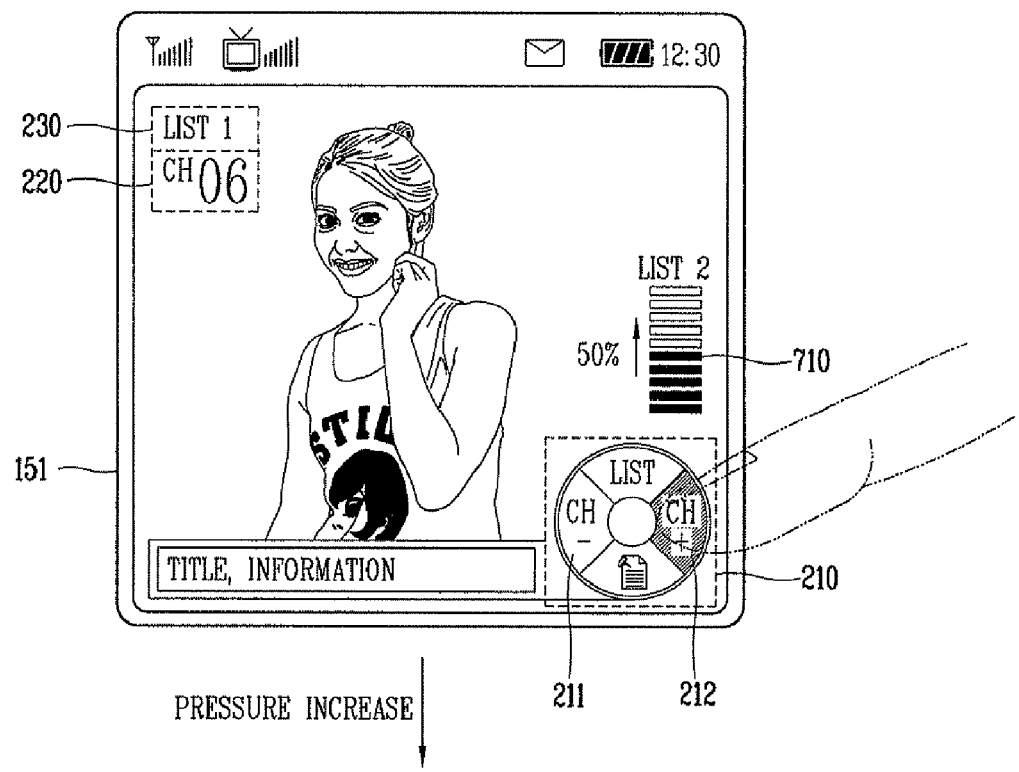
PRESSURE INCREASE
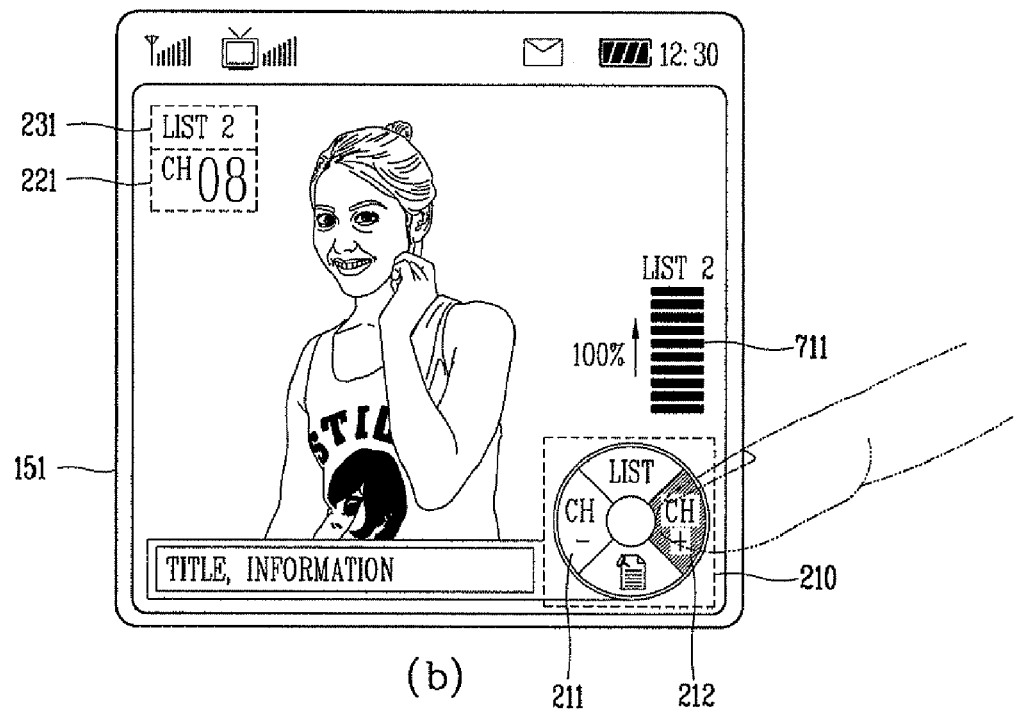
(b)

MOBILE TERMINAL AND METHOD FOR CONVERTING BROADCAST CHANNEL OF A MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2007-0112865, filed on Nov. 6, 2007, the contents of which is incorporated by reference herein in its entirety.

FIELD OF THE INVENTION

The present invention is directed to a mobile terminal receiving a broadcast channel and, specifically to a method for converting, such as by changing or selecting, a channel on a desired channel list such that a channel list can be changed without having to select a menu when it is desired to change a channel while a broadcast or broadcast data is being received.

DESCRIPTION OF THE RELATED ART

A mobile terminal is a device that can be carried and has one or more functions, such as voice and video call communication, inputting and outputting information and storing data. A mobile terminal can support more complicated functions, such as capturing images or video, reproducing music or video files, playing games and receiving broadcast signals. A mobile terminal may be embodied in the form of a multimedia player or device by comprehensively and collectively implementing such functions.

Numerous attempts are being made to implement hardware or software in such multimedia players or devices. For example, a user interface environment is provided to allow users to easily and conveniently search or select one or more functions in order to implement various functions. The ability to quickly change a user desired channel is required as the number of broadcast channels increases.

Furthermore, various designs for mobile terminals are required as users consider their mobile terminal to be a personal portable device that may express their personality. For example, mobile terminals are implemented with folder type, slide type, bar type and rotation type designs.

SUMMARY OF THE INVENTION

In one aspect of the present invention, a mobile terminal is provided. The mobile terminal includes a wireless communication unit for receiving broadcast data, an output unit for displaying the received broadcast data, a manipulation unit for receiving at least one specific key input for changing a channel, a touch screen for receiving at least one touch input for changing a channel and a controller for detecting an input method of the at least one specific key input or the at least one touch input and changing a channel of a specific channel list according to the detected input method while processing and displaying the received broadcast data on the output unit.

It is contemplated that the input method is one of a time period during which the at least one specific key or the at least one touch input is received, an area in which the at least one specific key input or at least one touch input is received, a position or region in which the at least one specific key input or at least one touch input is received, a number of specific key inputs or touch inputs simultaneously received, a number of successive specific key inputs or touch inputs, an input direction, or an input shape. It is further contemplated that the controller separately displays at least one of a first soft menu for channel change or a second soft menu for channel list change and either changes a channel list or changes a channel according to an input received on the at least one of the first soft menu or the second soft menu.

It is contemplated that the controller displays the first soft menu for channel change and either changes a channel list according to a direction or shape of the input received on the first soft menu or changes a channel on the changed channel list. It is further contemplated that the controller displays the first soft menu for channel change at a different position according to each of a plurality of channel lists and changes a channel on one of the plurality of channel lists corresponding to the first soft menu upon receiving a key or a touch for channel change.

It is contemplated that the controller either changes a channel on a currently set channel list or changes the currently set channel list to a different channel list according to input information related to the at least one specific key input or the at least one touch input. It is further contemplated that the controller changes the specific channel list and simultaneously performs channel change on the changed specific channel list upon receiving two or more specific key inputs or two or more touch inputs for channel change within a predetermined time period.

It is contemplated that the controller controls the touch screen to display at least one of a first soft menu for channel change or a second soft menu for changing a channel list upon receiving a specific key input or touch input for channel change. It is further contemplated that the broadcast data includes at least one of a TV broadcast signal, a radio broadcast signal, or a data broadcast signal. Preferably, the broadcast data includes information associated with at least one of a broadcast channel, a broadcast program, or a broadcast service provider.

In another aspect of the present invention, a method for changing a broadcast channel of a mobile terminal, the method is provided. The method includes detecting at least one specific key input or at least one touch input while receiving broadcast data and either changing a currently set first channel list to a second channel list according to an input method of the detected at least one specific key input or at least one touch input or changing the currently set first channel list to the second channel list and simultaneously changing a channel on the second channel list while displaying the received broadcast data.

It is contemplated that the input method of the detected at least one specific key input or at least one touch input includes information for either a channel list change or a channel change. It is further contemplated that the method further includes determining the input method according to at least one of a time period during which the at least one specific key input or at least one touch input is received, an area in which the at least one specific key input or at least one touch input is received, a position or region in which the at least one specific key input or at least one touch input is received, a number of specific key inputs or touch inputs simultaneously received, a number of successive specific key inputs or touch inputs received, an input direction, or an input shape.

It is contemplated that changing the channel includes either changing a channel list or changing the channel on a specific channel list according to a direction in which the at least one specific key input or at least one touch input is received or an input shape of the at least one touch input. It is further contemplated that the input shape includes either a straight line or a curved line.

It is contemplated that the method further includes displaying at least one of a first soft menu for channel change or a second soft menu for changing a channel list when the at least one specific key input or at least one touch input is detected. It is further contemplated that the method further includes displaying the first soft menu at a position corresponding to a specific channel list and changing the channel on the specific channel list upon receiving a key or a touch for channel change on the first soft menu.

It is contemplated that the first channel list is changed to the second channel list and the channel on the second channel list is simultaneously changed upon simultaneously or successively receiving two or more specific key inputs or two or more touch inputs for channel change within a predetermining time period. It is further contemplated that the broadcast data includes at least one of a TV broadcast signal, a radio broadcast signal, or a data broadcast signal. Preferably, the broadcast data includes information associated with at least one of a broadcast channel, a broadcast program, or a broadcast service provider.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 10 illustrates a method for converting a channel while receiving and displaying broadcast data in a mobile terminal according to a sixth embodiment of the present invention.

DETAILED DESCRIPTION OF THE PREFERRED EMBODIMENTS

Figure 1:
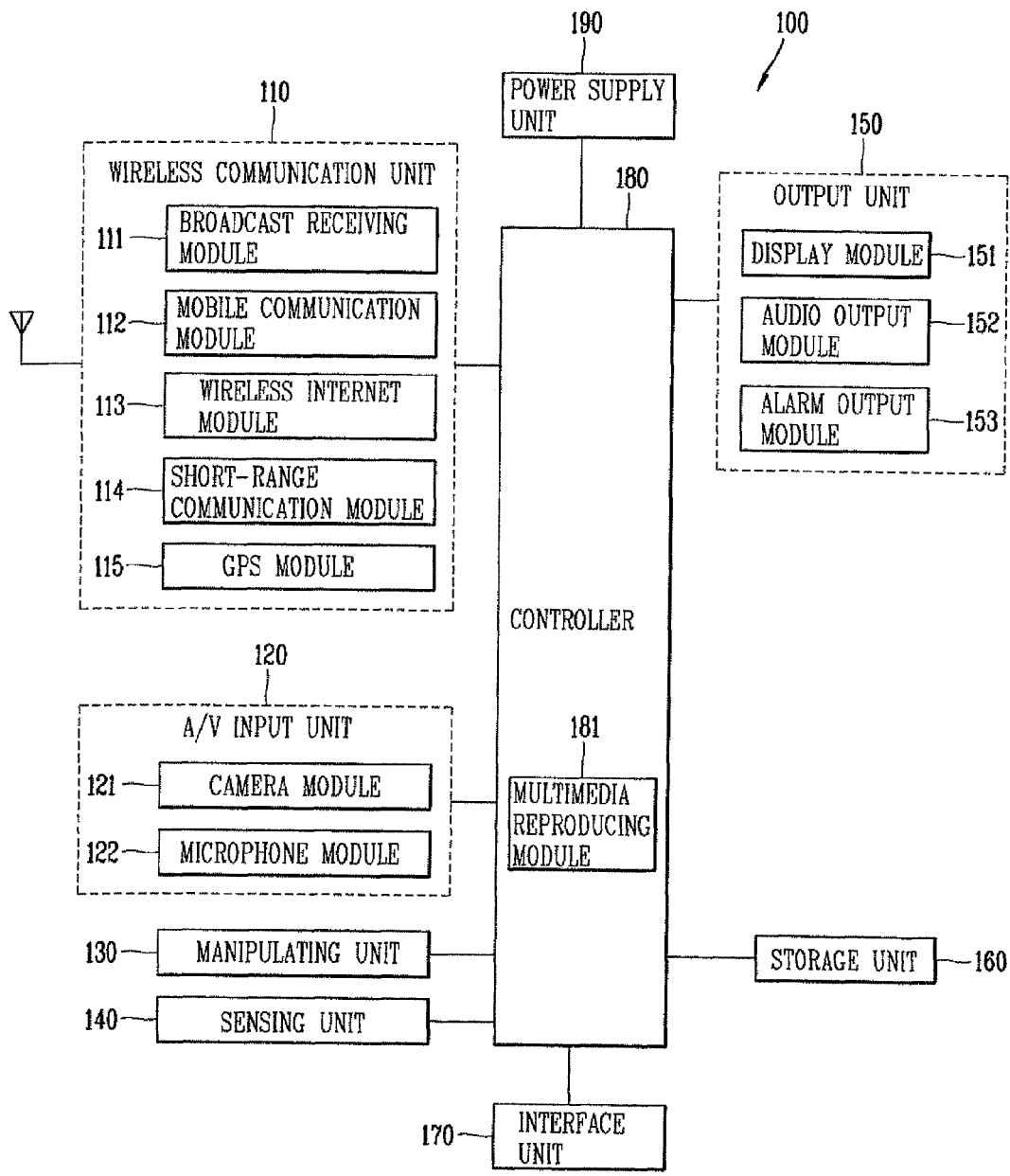
FIG. 1 is a block diagram of a mobile terminal according to the present invention.

Various embodiments of the present invention are described in detail with reference to the accompanying drawings. Detailed explanation for functions or constructions considered to unnecessarily divert from the gist of the present invention are omitted but would be understood by those skilled in the art. The same reference numerals are used for the same elements that perform the same function.

FIG. 1 is a block diagram of a mobile terminal according to the present invention. The mobile terminal 100 may be a mobile phone, a smart phone, a notebook computer, a navigation terminal, a DMB (Digital Multimedia Broadcasting) terminal, a PDA (Personal Digital Assistant), or a PMP (Portable Multimedia Player).

As illustrated in FIG. 1, the mobile terminal 100 includes a wireless communication unit 110, an audio/video (A/V) input unit 120, a manipulating unit 130, a sensing unit 140, an output unit 150, a storage unit 160, an interface unit 170, a controller 180 and a power supply unit 190. It is contemplated that two or more elements illustrated in FIG. 1 may be combined or one particular element may be divided into two or more elements.

The wireless communication unit 110 illustrated in FIG. 1 includes a broadcast receiving module 111, a mobile communication module 112, a wireless Internet module 113, a short-range communication module 114 and a Global Positioning System (GPS) module 115.

The broadcast receiving module 111 receives a broadcast signal and/or broadcast associated information from an external broadcast management server via a broadcast channel. The broadcast channel may be a satellite channel or a terrestrial channel. The broadcast management server may be a server that generates and transmits a broadcast signal and/or broadcast associated information or a server that receives and sends a pre-generated broadcast signal and/or broadcast associated information to the mobile terminal 100. Broadcast signals and/or broadcast associated information received via the broadcast receiving module 111 may be stored in the storage unit 160.

The broadcast associated information may include information associated with a broadcast channel, a broadcast program, or a broadcast service provider. The broadcast signal may include a TV broadcast signal, a radio broadcast signal, a data broadcast signal, or a broadcast signal obtained by combining the data broadcast signal with the TV broadcast signal or the radio broadcast signal. The broadcast associated information may be provided via a mobile communication network and received by the mobile communication module 112.

The broadcast associated information may have various formats. For example, the broadcast associated information may be an Electronic Program Guide (EPG) of Digital Multimedia Broadcasting (DMB) or an Electronic Service Guide (ESG) of Digital Video Broadcast-Handheld (DVB-H).

The broadcast receiving module 111 receives broadcast signals from various types of broadcast systems. Specifically, the broadcast receiving module 111 may receive digital broadcast signals utilizing digital broadcast systems such as Digital Multimedia Broadcasting-terrestrial (DMB-T), Digital Multimedia Broadcasting-satellite (DMB-S), Media Forward Link Only (MediaFLO™), Digital Video Broadcast-handheld (DVB-H), and Integrated Services Digital Broadcast-Terrestrial (ISDB-T). The broadcast receiving module 111 may be suitable for certain broadcast systems that provide broadcast signals, as well as for the digital broadcasting systems.

The mobile communication module 112 transmits and receives radio signals to and from at least a base station, an external mobile terminal, or a server in a mobile communication network. The radio signals may include a voice call signal, a video call signal, or various formats of data according to transmission/reception of text/multimedia messages.

The wireless Internet module 113 supports wireless network access. The wireless Internet module 113 may be internally or externally coupled to the mobile terminal 100.

The short-range communication module 114 supports short range communications. Examples of short-range communication technology are Bluetooth™, Radio Frequency IDentification (RFID), Infrared Data Association (IrDA), and Ultra-WideBand (UWB), ZigBee™.

The Global Positioning System (GPS) module 115 may receive location information from a GPS network.

The A/V input unit 120 is configured to input an audio or video signal. The A/V input unit 120 may include a camera module 121 and a microphone module 122.

The camera module 121 processes image data of still pictures or videos obtained by an image capture device in a video capturing mode or an image capturing mode. The processed image frames may be displayed on a display module 151.

The image frames processed by the camera module 121 may be stored in the storage unit 160 or transmitted via the wireless communication unit 110. Two or more camera modules 121 may be provided according to the configuration of the mobile terminal 100.

The microphone module 122 may receive sounds or audible data via a microphone in a phone call mode, a recording mode, or a voice recognition mode, and process the received sounds as audio data. The processed audio or voice data may be converted for output into a format transmittable to a mobile communication base station via the mobile communication module 112 in a phone call mode. The microphone module 122 may include various types of noise canceling or suppression algorithms to cancel or suppress noise generated while receiving and transmitting audio signals.

The manipulating unit 130 may process key input data input by a user in order to control various operations of the mobile terminal 100. The manipulating unit 130 may include a keypad, a dome switch, a jog wheel, a jog switch or a touch pad, such as a touch sensitive member that detects changes in resistance, pressure or capacitance. A touch pad overlaid on the display 151 in a layered manner may be referred to as a "touch screen".

The sensing unit 140 detects a current status or state of the mobile terminal 100, such as an open/close state of the mobile terminal, a location of the mobile terminal, or presence or absence of user contact with the mobile terminal. The sensing unit 140 generates commands or signals for controlling the operation of the mobile terminal 100.

For example, the sensing unit 140 may sense whether a slide phone is opened or closed. The sensing unit 140 may also detect whether the power supply unit 190 supplies power or whether the interface unit 170 is coupled to an external device.

The interface unit 170 provides an interface with at least one external device connected with the mobile terminal 100. The external device may be a wired/wireless headset, an external power charger, a wired/wireless data port, a card socket for receiving a memory card, a Subscriber Identity Module/User Identity Module (SIM/UIM) card, an audio input/output (I/O) port, video I/O ports, earphones, or a microphone.

The interface unit 170 may receive inputs, such as data, information, or power from an external device and transfer the received inputs to one or more elements within the mobile terminal 100. The Interface unit 170 may also transfer data from the mobile terminal 100 to an external device.

The output unit 150 provides outputs in a visual, audible, and/or tactile manner, such as an audio signal, video signal, or alarm signal. The output unit 150 may include a display module 151, an audio output module 152, and an alarm output module 153.

The display module 151 may output information processed in the mobile terminal 100. The display module 151 may display a User Interface (UI) or a Graphic User Interface (GUI) associated with a call or other communication when the mobile terminal 100 is in a phone call mode. The display module 151 may display a captured and/or received image, a UI, or a GUI when the mobile terminal 100 is in a video call mode or an image capturing mode.

The display module 151 may function as both an input device and an output device when the display module and the touch pad are overlaid in a layered manner to form a touch screen. The display module 151 may include at least one of a Liquid Crystal Display (LCD), a Thin Film Transistor-LCD (TFT-LCD), an Organic Light Emitting Diode (OLED), a flexible display, or a three-dimensional (3D) display.

The mobile terminal 100 may include two or more display modules 151 or other display means. For example, the mobile terminal 100 may include an external display screen and an internal display screen.

The audio output module 152 may output audio data received from the wireless communication unit 110 or stored in the storage unit 160 in a call signal reception mode, a call mode, a record mode, a voice recognition mode, or a broadcast reception mode. The audio output module 152 may provide audible outputs related to a particular function performed by the mobile terminal 100, such as a call signal reception sound or a message reception sound. The audio output module 152 may include a speaker or a buzzer.

The alarm output module 153 may provide outputs to indicate an occurrence of an event in the mobile terminal 100. Typical events include call signal reception, message reception, and key signal input.

The alarm output module 153 may provide outputs other than audio or video. For example, the alarm output module 153 may provide vibrations or other tactile outputs.

The alarm output module 153 may provide tactile outputs, such as vibrations, to alert the user when a call signal, a message, or some other incoming communication is received such that the user can recognize the occurrence of various events. Outputs indicating occurrence of an event may be also provided via the display module 151 or the audio output module 152.

The storage unit 160 may store software programs used for the processing and control performed by the controller 180 or may temporarily store data, such as a phonebook, messages, still images, or video. The storage unit 160 may include at least one type of storage medium such as a flash memory, a hard disk memory, a multimedia card memory, a Random Access Memory (RAM), a Read-Only Memory (ROM), or a card-type memory, such as SD or DX memory. The mobile terminal 100 may also communicate over a network connection with a network storage device that performs the functions of the storage unit 160.

The controller 180 typically controls the general operations of the mobile terminal 180. For example, the controller 180 performs control and processing associated with voice calls, data communications, and video calls.

The controller 180 may include a multimedia reproducing or playback module 181 for reproducing or playing back multimedia data. The multimedia reproducing module 181 may be configured as a hardware component within the controller 180 or may be configured as a software component separated from the controller or a combination of a hardware and software component.

The power supply unit 190 receives external or internal power and supplies power required for the operations of the respective elements of the mobile terminal 100 under the control of the controller 180.

The functions of the internal elements of the mobile terminal 100 have been described with reference to FIG. 1. The functions of the external elements of the mobile terminal 100 will be described with reference to FIGS. 2 and 3.

The mobile terminal 100 may be implemented in a variety of different configurations, such as a folder-type, a bar-type, a swing-type, or a slide-type. For the sake of brevity, a slide-type mobile terminal 100 will be used as an example. However, the concepts and features described herein should are not limited to the slide-type mobile terminal 100 and may be applicable to any type of mobile terminal or other electronic device.

Figure 2:
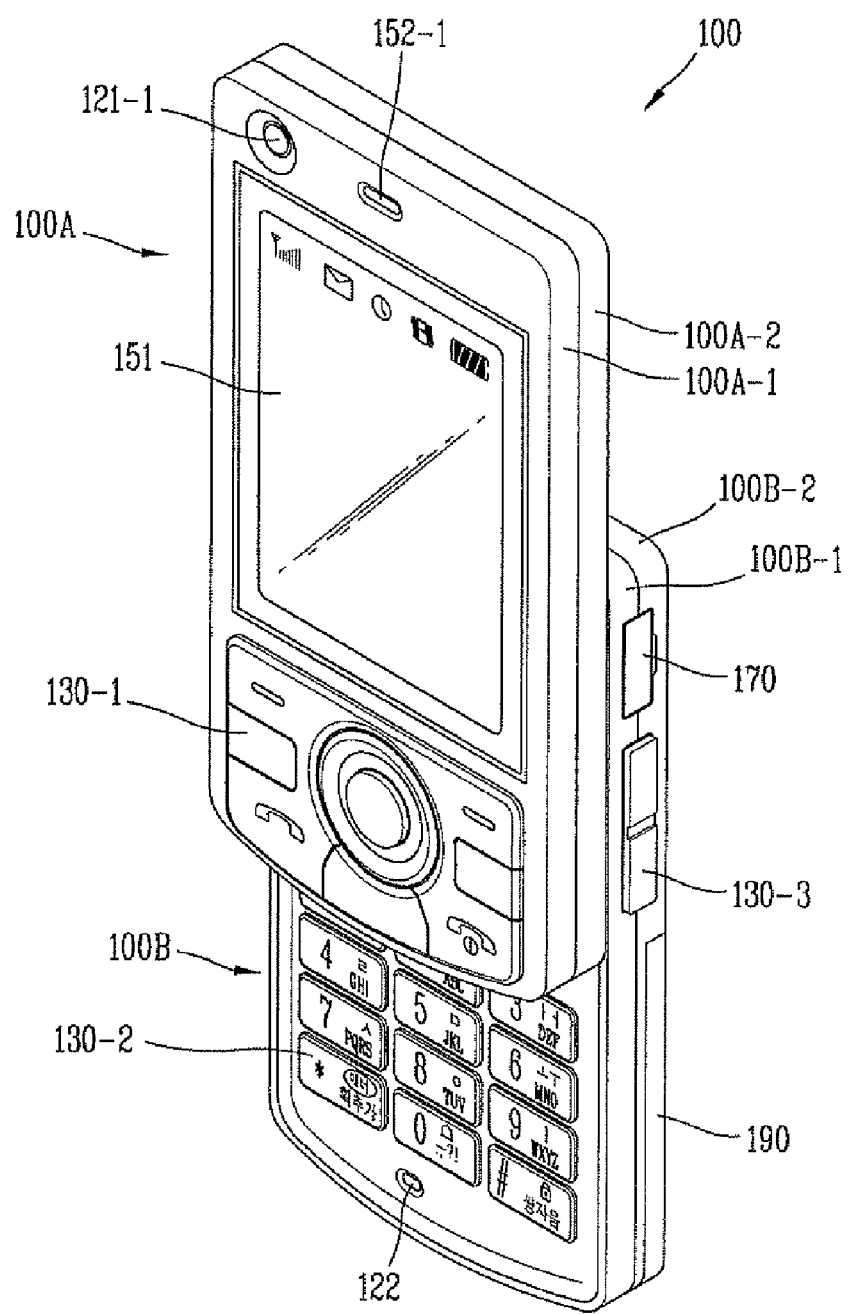
FIG. 2 is a front perspective view of a mobile terminal according to an embodiment of the present invention.

FIG. 2 is a front view of a mobile terminal 100 according to the present invention. As illustrated in FIG. 2 mobile terminal 100 includes a first body 100A and a second body 10B. The second body 100B is configured to slidably move in at least one direction with respect to the first body 100A.

A state in which the first body 100A overlaps the second body 100B may be referred to as a 'closed configuration'. A state in which the first body 100A exposes at least a portion of the second body 100B may be referred to as an 'open configuration'.

The mobile terminal 100 typically operates in a standby mode in the closed configuration. However, the user can release the standby mode.

The mobile terminal 100 may function primarily in a call mode in the open configuration. However, the call mode may be changed to the standby mode according to user manipulation or after the lapse of a certain time.

At least one case, such as housing, casing, or cover forms the external appearance of the first body 100A. The first body 100A includes a first front case 100A-1 and a first rear case 100A-2.

Various electronic components may be installed inside the first front case 100A-1 and the first rear case 100A-2. One or more intermediate cases may be located between the first front case 100A-1 and the first rear case 100A-2. The first front case 100A-1 and second case 100A-2 can be formed by injection-molding a synthetic resin or made of a metallic material, such as stainless steel (STS) or titanium (Ti), or some other appropriate material.

The display module 151, a first audio output module 152-1, a first camera module 121-1 or a first manipulating unit 130-1 may be located on the first front case 100A-1 of the first body 100A. The display module 151 may include an LCD or OLED that visually displays information.

A touch pad may be overlaid in a layered manner on the display module 151. This configuration allows the display module to function as a touch screen for inputting information.

The first audio output module 152-1 may be a receiver or a speaker. The first camera module 121-1 may allow a user to capture still images or video of the user.

A case constituting the external appearance of the second body 100B may be formed by a second front case 10B-1 and a second rear case 100B-2. A second manipulating unit 130-2 may be located on the second body 100B, specifically, on a front face of the second front case 100B-1. A third manipulating unit 130-3, a microphone module 122 and an interface unit 170 may be located on either the second front case 100B-1 or the second rear case 100B-2.

The first, second and third manipulating units 130-1, 130-2 and 130-3 may constitute the manipulating unit 130. Various configurations can be employed for the manipulation unit as long as the user can operate the manipulating unit in a tactile manner.

The manipulating unit 130 can be implemented as a dome switch or touch pad that receives user commands or information via pressing, pushing or touching. The manipulating unit 130 may also be implemented as a dial, a wheel, a jog element, or a joystick in order to allow user manipulation.

The first manipulating unit 130-1 is used for inputting commands, such as start, end, or scroll. The second manipulating unit 130-2 is used for inputting numbers, characters, or symbols. The third manipulating unit 130-3 may support a "hot key function," such as speed dialing or dedicated key inputs for activating a special function of the mobile terminal 100.

The microphone module 122 may be suitable for receiving the user's voice and other various sounds.

The interface unit 170 may be used as a link passage or path through which the mobile terminal 100 can exchange data with an external device. For example, the interface unit 170 may be implemented as a connection port for connecting an earphone to the mobile terminal 100 via a fixed or wireless means, as power supply ports for providing power to the external device or as a port for short-range communications such as an Infrared Data Association (IrDA) port, a Bluetooth™ port, or a wireless LAN port.

The power supply unit 190 for supplying power to the terminal is located at the side portion of the second rear case 100B-2. The power supply unit 190 may be a rechargeable battery that can be detached.

Figure 3:
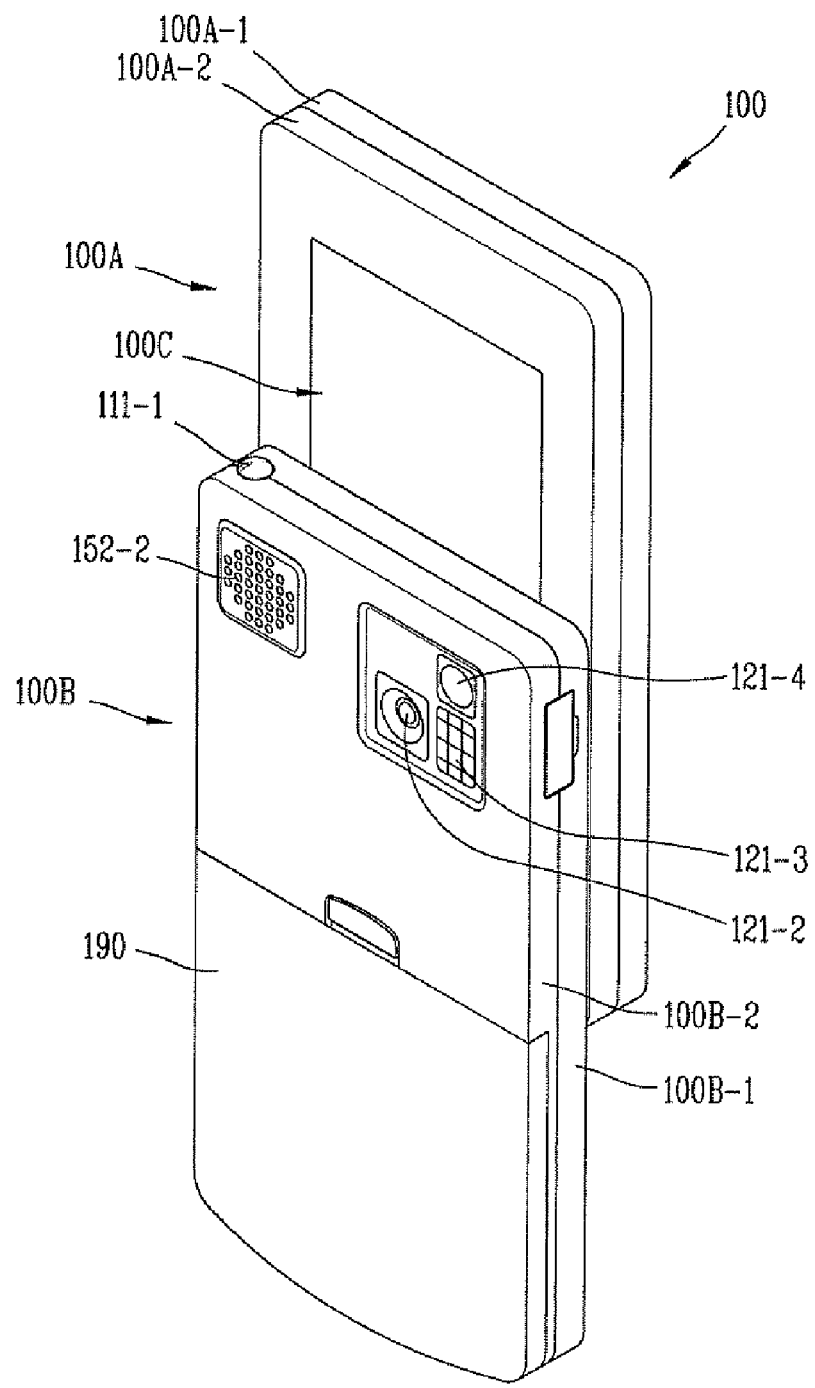
FIG. 3 is a rear view of the mobile terminal of FIG. 2.

FIG. 3 is a rear view of the mobile terminal 100 of FIG. 2. As illustrated in FIG. 3, a second camera module 121-2 may be located on a rear surface of the second rear case 100B-2 of the second body 10B. The second camera module 121-2 may have an image capture direction which is substantially the opposite to that of the first camera module 121-1 illustrated in FIG. 1 and may support a different number of pixels than the first camera.

For example, the first camera module 121-1 may be have low resolution that supports a relatively small number of pixels in order to quickly capture an image or video of the user's face and immediately transmit the captured image or video to another party during video conferencing. On the other hand, the second camera module 121-2 may have high resolution supporting a relatively large number of pixels in order to capture more detailed higher quality images or video that typically need not be transmitted immediately.

A flash 121-3 and a mirror 121-4 may be located adjacent to the second camera module 121-2. The flash 121-3 illuminates a subject when an image of the subject is captured with the second camera module 121-2. The mirror 121-4 allows the user to see himself when capturing a self-image using the second camera module 121-2.

The second rear case 100B-2 may further include a second audio output module 152-2. The second audio output module 152-2 may implement a stereophonic sound function in conjunction with the first audio output module 152-1 illustrated in FIG. 2 and may also be used for sending and receiving calls in a speaker phone mode.

A broadcast signal receiving antenna 111-1 may be located at one side or region of the second rear case 100B-2 in addition to an antenna that supports mobile communications. The broadcast signal receiving antenna 111-1 may be retractable from the second body 100B-2.

A first portion of a slide module 100C that slidably combines the first body 100A and the second body 100B may be located on the first rear case 100A-2 of the first body 100A. A second portion of the slide module 100C may be located on the second front case 100B-1 of the second body 100B that is not exposed in FIG. 3.

Although the second camera module 121-2 is illustrated in FIG. 3 as located on the second body 100B, the mobile terminal 100 is not so limited. For example, one or more of the elements, such as 111-1, 121-2, 121-3, and 152-2 that are illustrated as located on the second rear case 100B-2 in FIG. 3 may be located on the first body 100A, specifically on the first rear case 100A-2 such that they are protected or covered by the second body in the closed configuration. Furthermore, no second camera module 121-2 may be provided and the first camera module 121-1 may be rotatably or otherwise movable to allow image capturing in various directions.

A channel list may include a basic channel list that shows every searched broadcast channel that can be received and a preference channel list formed by grouping channels preferred by the user according to categories, such as music, movies, soap operas, games, TV, and radio. Therefore, the basic channel list or the preference channel list may be output according to pre-set broadcast environment setting information when the mobile terminal 100 enters a broadcast mode and outputs a broadcast screen image.

A user may select a desired channel list from among two channel lists. For example, channel conversion is performed only in the preference channel list if the user selects the preference channel list and inputs a channel conversion key or activates a similar function.

The output unit 150 may output broadcast data of the selected channel when a broadcast channel is selected. Channels registered in the preference channel list are sequentially converted for output when the user presses a channel conversion button or otherwise changes channels while the broadcast data is being output. A menu should be retrieved in order to change the current channel list to a new channel list if a broadcast channel different from the channels registered in the preference channel list is desired.

The present invention provides a method whereby a current channel list is automatically changed to a channel list desired by the user without selecting a menu when the user desires to change a broadcast channel while broadcast data is being received and displayed channel conversion is performed at the same time in the changed channel list. Various embodiments of the present invention will be described in detail.

Figure 4:
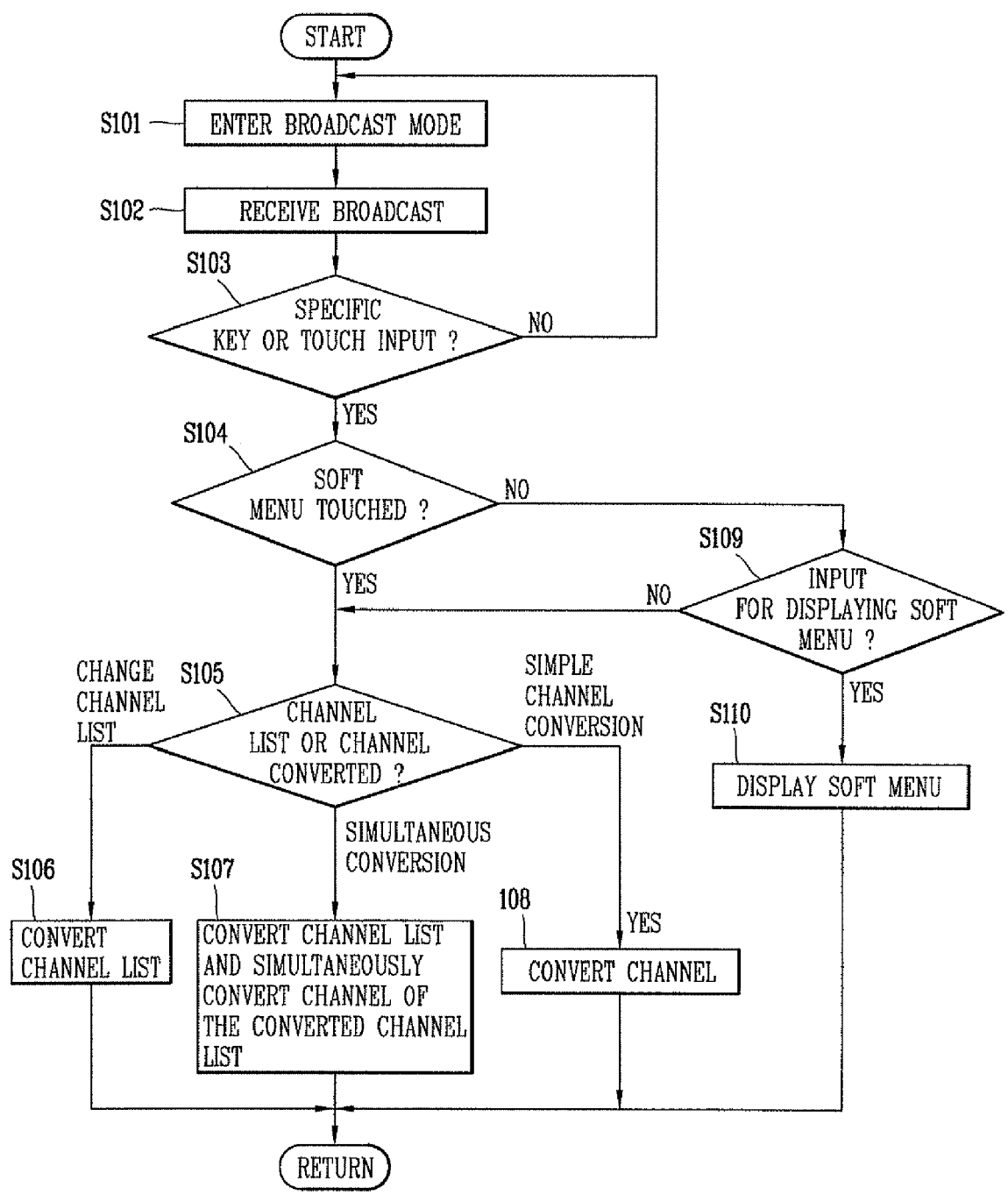
FIG. 4 is a flow chart of a method for converting a channel while receiving and displaying broadcast data in a mobile terminal according to the present invention.

FIG. 4 illustrates a flow chart of a method for converting or changing a channel while broadcast data is being received and displayed. As illustrated in FIG. 4, the mobile terminal 100 enters a broadcast mode (S101) and broadcast data is received via the broadcast receiving module 111 and displayed via the display module 151 (S102). The controller 180 may perform a broadcast channel conversion or a broadcast list conversion operation according to an input method when a specific key is input via the manipulating unit 130 or when a touch operation is input via a touch screen of the display module 151 (S103).

The input method refers to process that can detect at least one type of information according to a time duration during which the key or the touch is input, an area at which the key or the touch is input, a position or a region at which the key or the touch is input, the number of simultaneously input keys or touches, the number of keys or touches that are continuously input, the direction in which the key or the touch is input, the pressure at which the key or the touch is input, or the shape in which the key or the touch is input. The operation of the controller 180 when the key or the touch is input may vary depending on whether or not a soft menu, such as a graphical menu, is displayed on the output unit 150 for channel conversion or channel list change.

The controller 180 may check whether the key or the touch has been input for channel conversion or to change a channel list according to the input method. For example, the controller 180 may perform channel conversion or an operation to change a channel list according to selection or activation of a soft menu item (S104, S105) when a soft menu or other graphical screen interface for channel conversion or a channel list change is displayed.

The controller 180 converts and outputs the channels on the currently selected channel list whenever a key or a touch for a simple channel conversion is input (S108). The controller 180 immediately changes a currently set channel list to a different channel list while broadcast data is received and displayed when the key or the touch input is for changing a channel list (S106). However, the broadcast data is not changed until a key or a touch for a channel conversion is input and the channel conversion is performed on the converted channel list even though the channel list is changed.

The method further reduces user inconvenience of having to change the channel list by going through a menu selection procedure by facilitating a channel conversion that is performed simultaneously when the channel list is changed (S107). Specifically, only the channel list is changed (S106), only a channel is converted on the currently selected channel list (S108), or a current channel list is changed to a different channel list and a channel is simultaneously converted in the changed channel list (S107) because the input method procedure includes both the information for changing the channel list and the information for channel conversion.

On the other hand, a soft menu can be displayed for a channel conversion or a channel list change (S109, S110) when a key or a touch is input or some other input means is activated when a soft menu or other graphical interface has not been displayed. For example, the controller 180 may output a soft menu for a channel conversion or a channel list change according to the input method (S109, S10) when a particular key or a touch is input while a broadcast is being received and displayed.

However, the channel list change and the channel conversion can be performed according to the input method (S107) even when the soft menu is not displayed on the output unit

150. For example, the currently set channel list may be changed to a different channel list and a channel conversion can be performed immediately after the channel list is changed.

The channel list change and the channel conversion are not necessarily performed sequentially. The channel list change and the channel conversion can be simultaneously performed according to a key or touch input method for the channel conversion. Specifically, the controller 180 may immediately convert and output a channel on a particular channel list stored in the storage unit 160 when a key or a touch for a channel conversion is input.

The present invention facilitates performing a channel list change and a channel conversion simultaneously by inputting or entering a key, a touch or some other activation means only one time while a broadcast received. A method for determining an operation according to a key input or other user activation means will now be described with reference to FIGS. 5-12.

Figure 5:
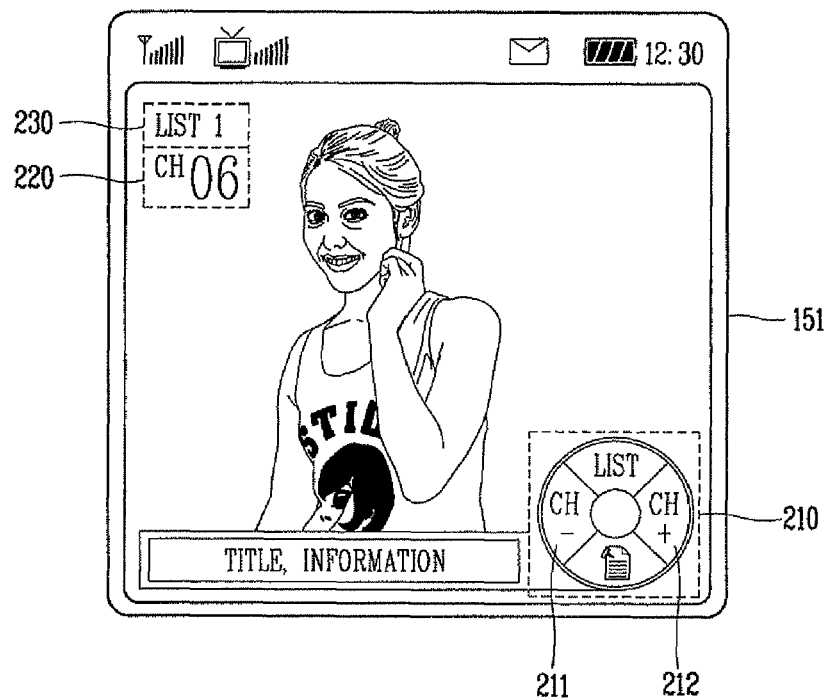
FIG. 5 illustrates a method for converting a channel while receiving and displaying broadcast data in a mobile terminal according to a first embodiment of the present invention.

FIG. 5 shows a method for converting a channel while broadcast data is received and displayed in a mobile terminal 100 according to a first embodiment of the present invention. Specifically, FIG. 5 illustrates a process in which a soft menu or other graphical interface for channel manipulation is displayed and either a channel list is changed and a channel is immediately changed on the changed channel list or only one of the channel list change and the channel conversion is performed according to a length of a time during which a key for the channel conversion is input, or the key press duration. As illustrated in FIG. 5, a soft menu 210 for channel manipulation, a region 220 with information about a channel output as a current broadcast screen image, and region 230 with information about a currently set channel list are displayed.

Channels are converted on the currently selected channel list (LIST 1) 230 and a broadcast is received via the broadcast receiving module 111 and displayed via the display module 151 when a key 211 or 212 for channel conversion of the displayed soft menu 210 or a particular key of the manipulation unit 130 is input and the length of time during which the key was input, or the key press duration, is shorter than a pre-set time. However, the currently set channel list (LIST 1) 230 is converted into a different channel list (LIST 2) and channels are converted at the same time on the converted channel list (LIST 2) while a broadcast is received via the broadcast receiving module 111 and displayed via the display module 151 if the length of the time during which the key 211 or 212 for the channel conversion is input, or the key press duration, is longer than the pre-set time.

The newly converted channel list information (LIST 2) is displayed at a certain screen region 230 of the channel list information when the channel list is converted. The newly changed channel information may be displayed on the region 220 of the channel information when a channel is changed.

Figure 6:
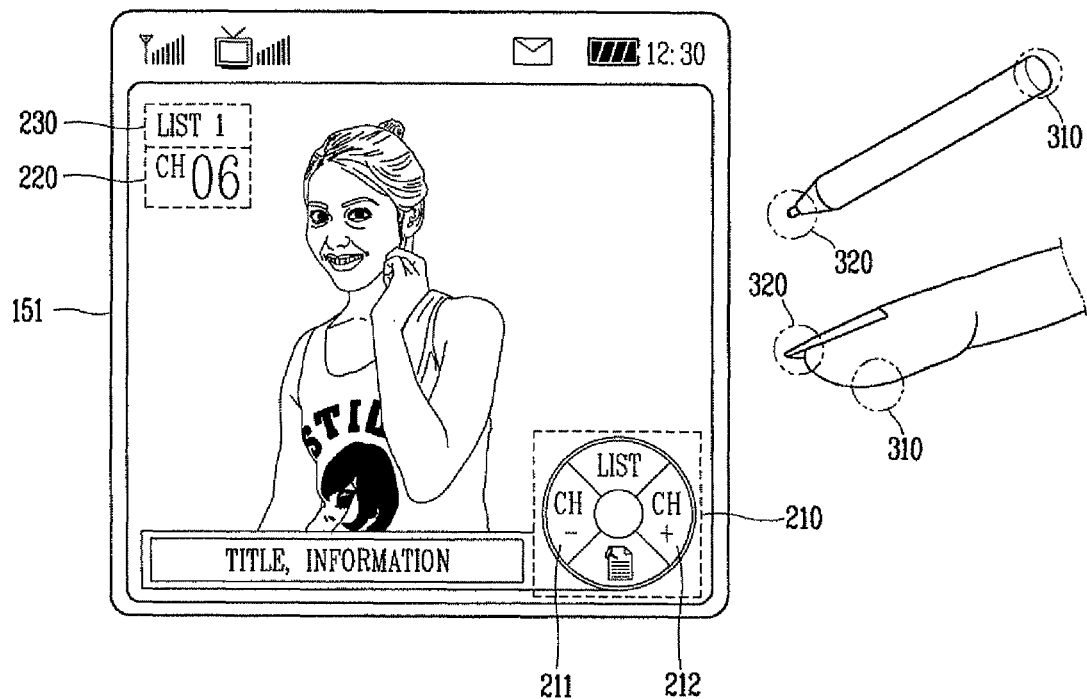
FIG. 6 illustrates a method for converting a channel while receiving and displaying broadcast data in a mobile terminal according to a second embodiment of the present invention.

FIG. 6 shows a method for converting a channel while broadcast data is received and displayed in a mobile terminal 100 according to a second embodiment of the present invention. Specifically, FIG. 6 illustrates a method for performing a channel conversion on a currently selected channel list or changing a currently selected channel list to a different channel list and simultaneously performing channel conversion according to a touched area of a key input for channel conversion when the soft menu for channel manipulation is displayed.

For example, the controller 180 can change the channel list and/or convert a channel at the same time when a key or a touch input is performed via the user's finger or a large portion of a pen or stylus. The controller 180 may perform only a channel conversion on the currently selected channel when a key or a touch is input a using user's fingertip or a narrow portion of the tip of the pen or stylus. It is contemplated that various other settings to receive different user inputs can be made.

It is assumed in FIG. 6 that the soft menu 210 or other graphical interface for channel conversion is displayed on the touch screen 151 of the mobile terminal 100. The controller 180 changes the channel list and simultaneously performs channel conversion when the user inputs or presses the key 211 or 212 or activates some other means for channel conversion by using a larger portion 310 of the user's finger or pen. However, the controller 180 may perform channel conversion on the currently selected channel list when the key 211 or 212 for channel conversion is input using a narrow portion 320 of the user's finger, such as the fingertip, or the narrow tip of the pen.

The channel list change operation or the channel conversion operation need not be performed only via inputs through the soft menu. These operations may also be performed when a particular portion of the touch screen 151 is touched.

Figure 7:
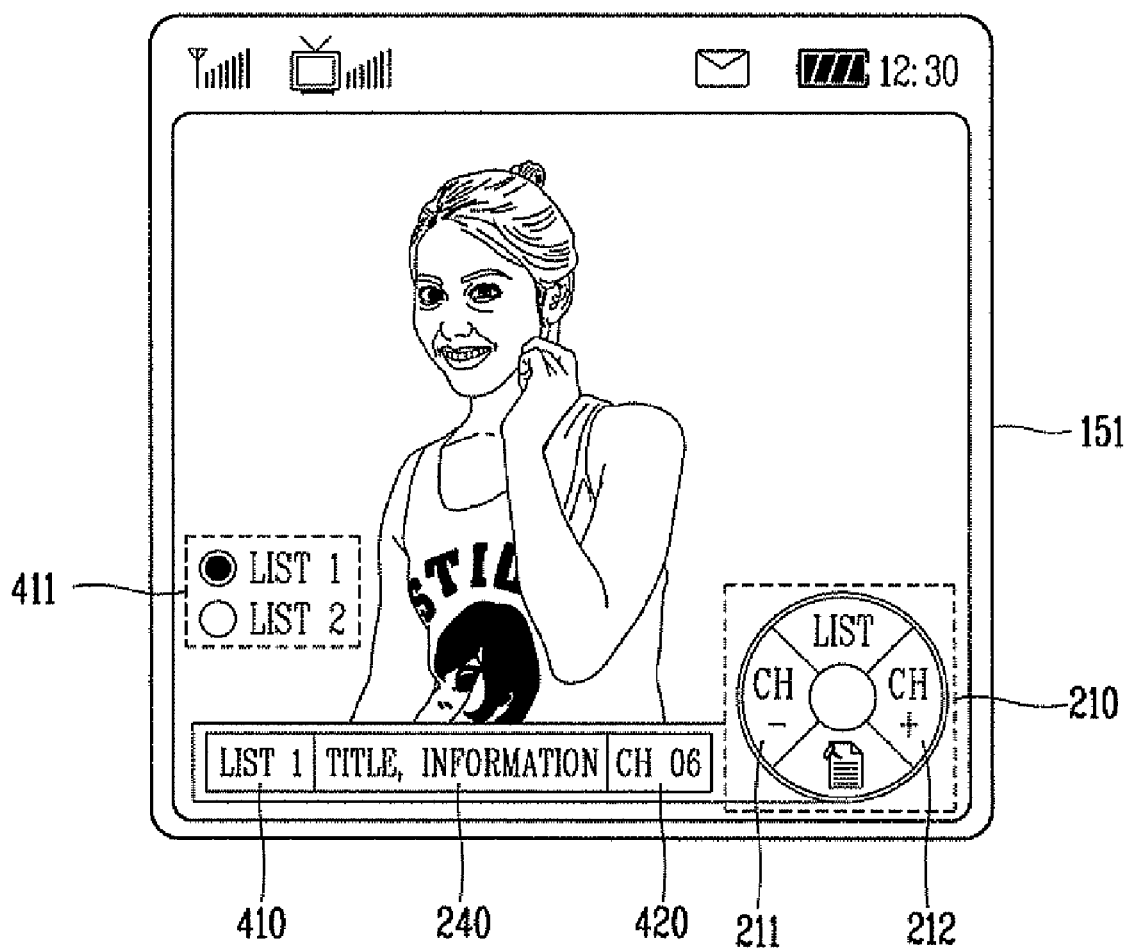
FIG. 7 illustrates a method for converting a channel while receiving and displaying broadcast data in a mobile terminal according to a third embodiment of the present invention.

FIG. 7 shows a method for converting a channel while broadcast data is received and displayed in a mobile terminal 100 according to a third embodiment of the present invention. As illustrated in FIG. 7, soft keys 410 and 411 for changing a channel list may be separately displayed on the touch screen 151 or provided at the manipulating unit 130 in addition to the soft menu 210 for channel manipulation. A display position of channel information 420 may change and the soft keys 410 and 411 for changing the channel list may be operated according to a toggle method or a shift key method.

A toggle method refers to a method in which the channel list can be changed whenever the soft key 410 is pressed. Two or more channel lists can be sequentially changed whenever the soft key 410 is pressed. Alternatively, only one channel list selected from multiple channel lists may be displayed when the soft key or select button 411 is pressed.

A shift key method refers to a method in which the channel list may be changed when the menu 211 or 212 for channel conversion is input and the soft key 410 is pressed. A channel may be converted on the currently selected channel list without changing the channel list if only the menu 211 or 212 for channel conversion is input without the soft key 410.

Color may be changed whenever the soft key 410 for changing the channel list is input and is displayed within the information display window 240. However, the position of the changed channel list can be varied.

Figure 8:
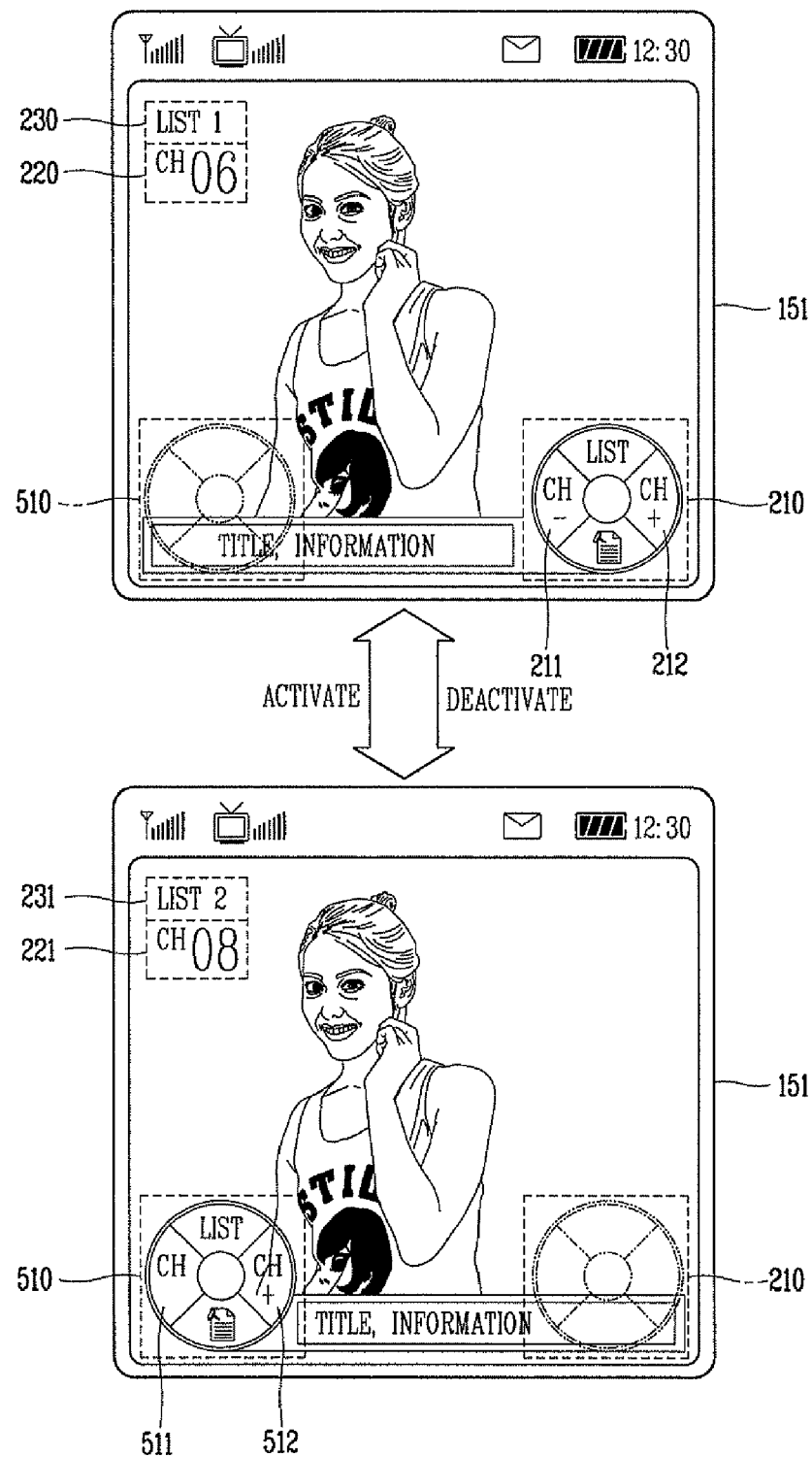
FIG. 8 illustrates a method for converting a channel while receiving and displaying broadcast data in a mobile terminal according to a fourth embodiment of the present invention.

FIG. 8 illustrates a method for converting a channel while broadcast data is received and displayed in a mobile terminal 100 according to a fourth embodiment of the present invention. As illustrated in FIG. 8, soft menus 210 and 510 or another graphical interface for channel conversion may be displayed at every channel list. The display positions of the soft menus 210 and 510 may vary according to, for example, the design of the terminal 100 or the number of channel lists.

As illustrated in FIG. 8, the soft menu 510 for manipulating channels on a basic channel list is displayed at the left side, while the soft menu 210 for manipulating channels of a preference channel list is displayed at the right side. When one soft menu 210 manipulated by the user is activated, the other soft menu 510 is deactivated.

The activated soft menu 210 may limit the display of the deactivated soft menu 510 and its transparency can be adjusted. The deactivated soft menu 510 is immediately activated and the other soft menu 210 is simultaneously deactivated when the user selects the deactivated soft menu. The soft menus 210 and 510 may be selected by touch screen inputs or by pressing a particular key of the manipulating unit 130.

As illustrated in FIG. 8, there is no need to perform an operation to change the channel list. For example, a user may input the soft key 511 or 512 for channel conversion in order to change a channel on the basic channel list. The controller 180 will then immediately change the channel on the basic channel list.

Furthermore, the user may input the soft key 211 or 212 for channel conversion of the corresponding soft menu 210 in order to change a channel on the preference channel list. The controller 180 will then immediately change the channel on the preference channel list. The channel list information 231 and the displayed channel information 221 corresponding to each soft menu 210 and 510 may be changed when the soft menus are activated according to user selection.

Figure 9:
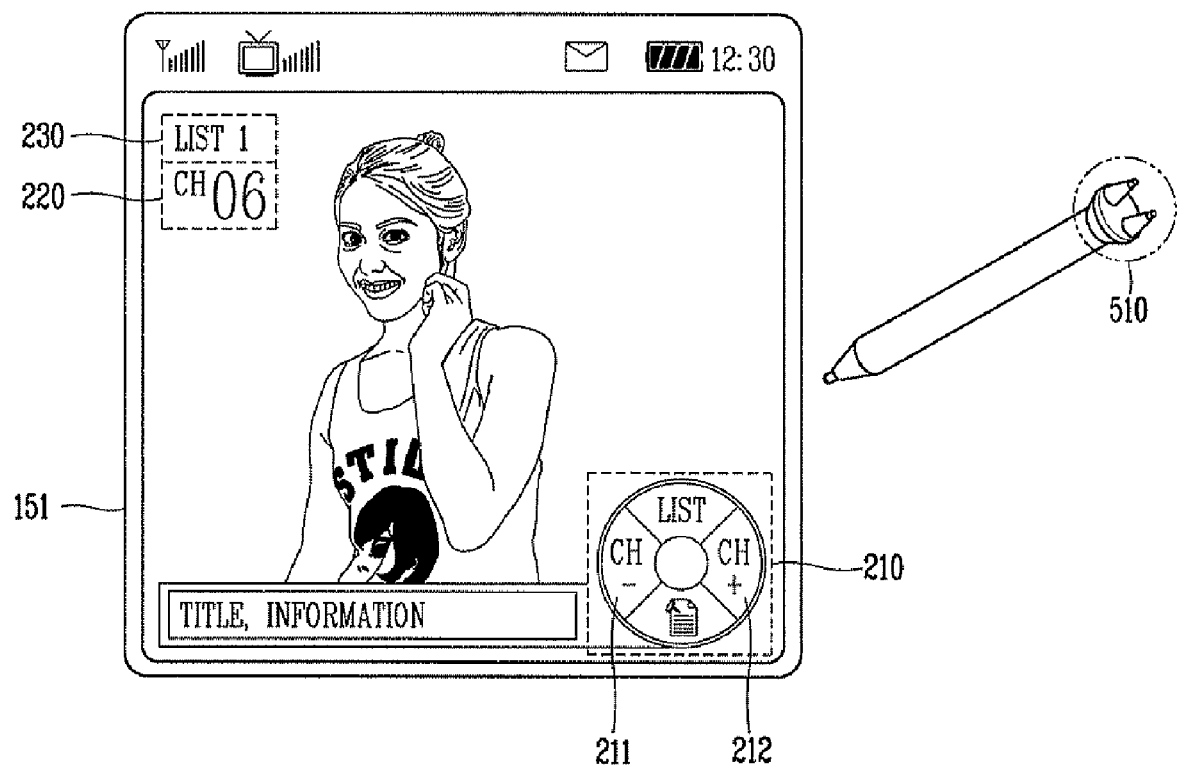
FIG. 9 illustrates a method for converting a channel while receiving and displaying broadcast data in a mobile terminal according to a fifth embodiment of the present invention.

FIG. 9 illustrates a method for converting a channel while broadcast data is received and displayed in a mobile terminal 100 according to a fifth embodiment of the present invention in which the operation is determined according to the number of key inputs for channel conversion. For example, the controller 180 may change the channel list or simultaneously perform channel conversion if two parts of the touch screen are simultaneously touched or a second touch is successively input within a specific time after a first touch is input when the soft menu 210 for channel manipulation is displayed. On the other hand the controller 180 may change the channel on the currently selected channel list if a single touch is input.

It is assumed in FIG. 9 that the soft menu 210 is displayed on the touch screen 151 of the mobile terminal 100. The controller 180 changes the channel list if the user touches two arbitrary points on the touch screen 151 with at least two fingers or with a pen or stylus 510 having two tips.

At least one of the two points at the pen 510 may be the soft key for channel conversion and the other point may be the region of the channel list information 230. However, such multi-touch inputs are not limited to the two points 510 illustrated in FIG. 9 and the two point regions need not be very close to each other.

Furthermore, the channel list may be changed when one arbitrary point is touched successively twice within a specific time duration. The touched point may be the region where the channel list information 230 is displayed.

Moreover, a specific region at which the same operation can be performed may be set on the touch screen 151. The channel conversion can be performed even when the channel conversion keys 211 and 212 are each touched one time.

FIG. 10 illustrates a method for converting a channel while broadcast data is received and displayed in a mobile terminal 100 according to a sixth embodiment of the present invention in which a corresponding operation is performed according to a pressure at which a key for performing channel conversion is pressed. For example, the controller 180 checks the pressure of an input key or touch region when a soft key 211 or 212 for channel conversion is input or touched while the soft menu 20 for a channel manipulation is displayed.

The controller 180 may perform a channel conversion operation registered in a channel list if the pressure is smaller than a pre-set pressure threshold. However, the controller 180 may change the currently set channel list (LIST 1) 230 to a different channel list (LIST 2) 231 and simultaneously perform channel conversion on the changed channel list if the touch pressure of the soft key 211 or 212 is greater than the pre-set pressure threshold.

The pressure value 710 may be displayed to allow the user to view the amount of applied pressure. The pressure value may be dynamically displayed in an extended or reduced shape or as an animation by using at least one of various shapes, numbers, colors, images, graphics and figures.

For example, a blue color may be displayed at a first touch and the blue color may change into red as the pressure increases. Furthermore, graphical indicators 711 that show the increasing or decreasing pressure may be displayed as animation.

The changed channel list information (LIST 2) 231 is displayed on the region of the channel list information when the channel list is changed. The newly changed broadcast channel information 221 may be displayed on the region of the channel information when the channel is changed.

Figure 11:
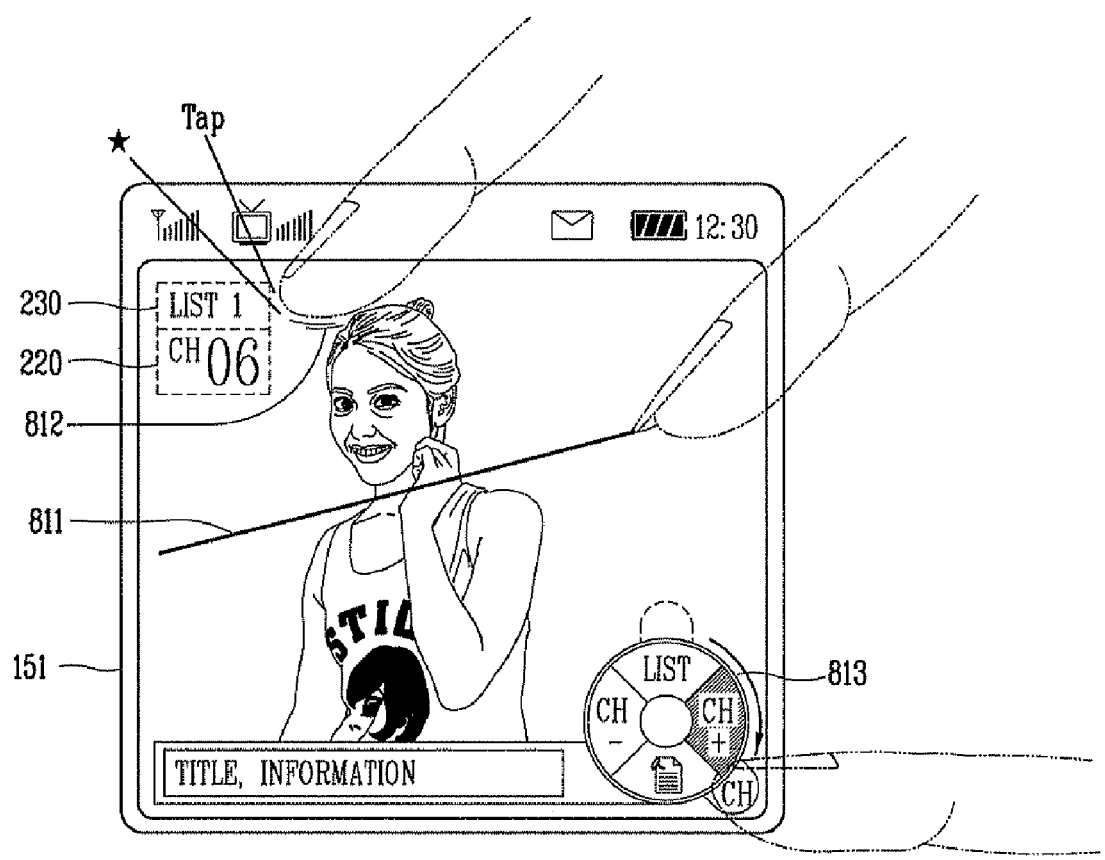
FIG. 11 illustrates a method for converting a channel while receiving and displaying broadcast data in a mobile terminal according to a seventh embodiment of the present invention.

FIG. 11 illustrates a method for converting a channel while broadcast data is received in a mobile terminal 100 according to a seventh embodiment of the present invention in which the controller 180 may change a currently selected channel list while a broadcast is received and displayed according to a touch input method and change a channel on the changed channel list. This method is applicable regardless of the shape of the soft menu for channel manipulation, such as graphical icons or an interface.

The touch input method refers to how the touch screen is touched by the user. For example, the user may draw a line 811 on the touch screen in a specific shape, such as straight or curved, and in a particular direction, such as vertical, horizontal, or diagonal. Furthermore, the user may touch a specific portion on the touch screen one or more times 812. Moreover, the user may touch a specific portion on the touch screen and rotate or move the specific portion 813. Various input methods can be set as a default according to the type of terminal 100 or the user's preference.

Figure 12:
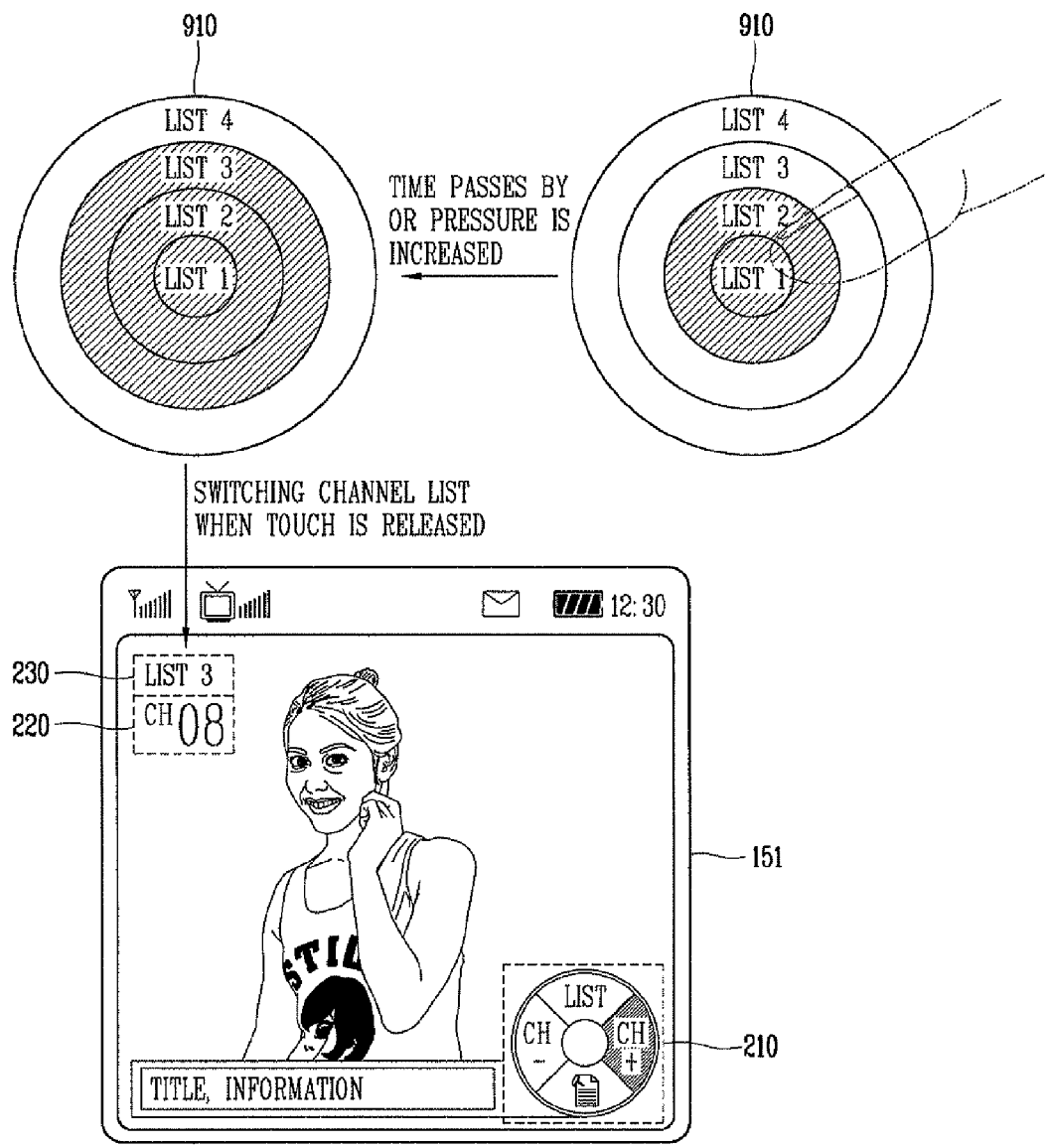
FIG. 12 illustrates a method for displaying an indicator according to a touch key input for channel conversion according to an embodiment of the present invention.

There can be several methods for changing the channel list information when the designated particular portion is touched 812. For example, the controller 180 may immediately change a corresponding channel list when a key or a touch is input according to a previously designated manner. On the other hand, an indicator 910 having a region that gradually expands from the touched portion may be displayed, as shown in FIG. 12.

The corresponding channel list may be changed to a channel list set in the expanded region where the touch contact is released. The expansion of the region may be performed according to a time period during which the touch is input, the pressure of the touch or the number of touches.

The previous description has been directed to the operations performed when a soft menu or other type of graphical interface or icons for channel manipulation is displayed. However, it is determined whether a key input is for displaying the soft menu or for changing a channel list if the soft menu is not displayed.

For example, a user touching an arbitrary point on the touch screen, the user opening the folder part of a mobile terminal 100, or the user inputting a specific key of the manipulating unit 130 may be determined as an input for displaying the soft menu. The soft menu may be displayed such that only a required button is shown, such as a channel list change key. The previously described methods may be performed after the soft menu is displayed.

However, the touch input method or the key input method may be preset to perform the channel list change method without retrieving the menu while a broadcast is received and displayed if the soft menu is not displayed, as illustrated in FIG. 11. The channel list information may be displayed by using, for example, the indicator when the channel list is changed.

A channel manipulation method according to a touch input has been described in the previous embodiments. However, using a specific key of the manipulating unit 130 may perform the same operations.

For example, two keys instead of a touch input may be simultaneously input or pressed in order to change the channel list and simultaneously change a channel in the fifth embodiment illustrated in FIG. 9. Furthermore, one or more keys may be input as long key(s) by being depressed for a specific length of time in order to change the channel list and simultaneously change a channel. Furthermore, one of the keys may be input for a short time as a short key input such that the key not held down in order to change only a channel on the currently selected channel list. Moreover, a separate or dedicated key may be provided to change the channel list or a specific key may be pressed or entered twice for a short time as a double input in order to change the channel list and pressed or entered once for a short time in order to change a channel.

The present invention is advantageous in that the user can simply change a channel on a desired channel list while broadcast data is being received and displayed without having to manipulation a menu for changing the channel. Furthermore, the present invention is advantageous in that the user can simply change a channel in the desired channel list without performing a process of selecting the channel list while broadcast data is being received and displayed. Moreover, the present invention is advantageous in that the user can immediately change to a desired channel on the desired channel when changing a channel according to a touch manipulation while broadcast data is being received and displayed.

The embodiments of the present invention may be implemented in several forms without departing from the characteristics thereof. Therefore, it should also be understood that the embodiments are not limited by any of the details of the foregoing description, unless otherwise specified, but rather should be construed broadly within its scope as defined in the appended claims. Various changes and modifications that fall within the scope of the claims, or equivalents of such scope are, therefore, intended to be embraced by the appended claims.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal, comprising:
a wireless communication unit configured to receive broadcast data;
a manipulation unit configured to receive at least a specific key input for changing a currently set channel of a plurality of channels or a specific key input for displaying a soft menu related to changing the currently set channel;
a touch screen configured to receive at least a touch input for changing the currently set channel or a touch input for displaying the soft menu; and
a controller configured to:
  detect an input method of input received via either the manipulation unit or the touch screen,
  determine whether the detected input method is for displaying the soft menu or for changing the currently set channel,
  either change channel list information to correspond to another of the plurality of channel lists and change channel information to correspond to another of a plurality of channels or display the soft menu on the touch screen according to the determination while the touch screen displays the received broadcast data corresponding to the currently set channel, and
  change the channel list information and simultaneously perform channel change on the changed channel list information upon receiving two or more specific key inputs or two or more touch inputs for channel change within a predetermined time period.

2. The mobile terminal of claim 1, wherein the input method is a time period during which the specific key input or the touch input is received, an area in which the specific key input or touch input is received, a position or region in which the specific key input or touch input is received, a number of specific key inputs or touch inputs simultaneously received, a number of successive specific key inputs or touch inputs received, an input direction, or an input shape.

3. The mobile terminal of claim 1, wherein the controller is further configured to:
separately display at least a first soft menu for channel change or a second soft menu for channel list change on the touch screen; and
either change the channel list information or the channel information according to an input received on the at least the first soft menu or the second soft menu.

4. The mobile terminal of claim 3, wherein the controller is further configured to display the first soft menu and either change the channel list information according to a direction or shape of the input received on the first soft menu or change the channel information corresponding to the another of the plurality of channel lists.

5. The mobile terminal of claim 3, wherein the controller is further configured to:
display the first soft menu at a different position according to each of the plurality of channel lists; and
change a channel on one of the plurality of channel lists corresponding to the first soft menu upon receiving a key input or a touch input for channel change.

6. The mobile terminal of claim 1, wherein the controller is further configured to either change a channel on a currently set channel list or change the currently set channel list to a different channel list according to input information related to the specific key input or the touch input.

7. The mobile terminal of claim 1, wherein the controller is further configured to display at least a first soft menu for channel change or a second soft menu for changing a channel list on the touch screen upon receiving a specific key input or touch input for channel change.

8. The mobile terminal of claim 1, wherein the broadcast data comprises at least a TV broadcast signal, a radio broadcast signal, or a data broadcast signal.

9. The mobile terminal of claim 1, wherein the broadcast data comprises information associated with at least a broadcast channel, a broadcast program, or a broadcast service provider.

10. A method for changing a broadcast channel of a mobile terminal, the method comprising:
   receiving broadcast data;
   detecting an input method via either at least one specific key input or at least one touch input while receiving the broadcast data;
   determining whether the detected input method is for changing a currently set channel or for displaying a soft menu related to changing the currently set channel; and
   either changing channel list information to correspond to another of a plurality of channel lists and changing channel information to correspond to another of a plurality of channels or displaying the soft menu according to the determination while displaying the received broadcast data corresponding to the currently set channel,
   wherein changing the currently set channel comprises changing at least a first channel list or a channel on a second channel list according to a direction in which the at least one specific key input or at least one touch input is received or changing an input shape of the touch input, and
   wherein the at least a first channel list is changed to the second channel list and the channel on the second channel list is simultaneously changed upon simultaneously or successively receiving two or more specific key inputs or two or more touch inputs for channel change within a predetermined time period.

11. The method of claim 10, wherein the detected input method comprises information for either a channel list change or a channel change.

12. The method of claim 10, further comprising:
   determining the input method according to at least a time period during which the specific key input or touch input is received, an area in which the specific key input or touch input is received, a position or region in which the specific key input or touch input is received, a number of specific key inputs or touch inputs simultaneously received, a number of successive specific key inputs or touch inputs received, an input direction, or an input shape.

13. The method of claim 10, wherein the input shape comprises either a straight line or a curved line.

14. The method of claim 10, further comprising:
   displaying at least a first soft menu for changing a channel or a second soft menu for changing a specific channel list in response to detection of the specific key input or touch input.

15. The method of claim 14, further comprising:
   displaying the first soft menu at a position corresponding to a specific channel list and changing the channel on the specific channel list upon receiving a key input or a touch input for channel change on the first soft menu.

16. The method of claim 10, wherein the broadcast data comprises at least a TV broadcast signal, a radio broadcast signal, or a data broadcast signal.

17. The method of claim 10, wherein the broadcast data comprises information associated with at a broadcast channel, a broadcast program, or a broadcast service provider.

* * * * *